United States Patent
Suyama et al.

(10) Patent No.: US 10,501,147 B2
(45) Date of Patent: Dec. 10, 2019

(54) BICYCLE DERAILLEUR

(71) Applicant: Shimano Inc., Sakai, Osaka (JP)

(72) Inventors: Shouta Suyama, Osaka (JP); Atsuhiro Emura, Osaka (JP); Kenta Nakamura, Osaka (JP)

(73) Assignee: Shimano Inc., Osaka (JP)

( * ) Notice: Subject to any disclaimer, the term of this patent is extended or adjusted under 35 U.S.C. 154(b) by 185 days.

(21) Appl. No.: 15/683,002

(22) Filed: Aug. 22, 2017

(65) Prior Publication Data

US 2019/0061876 A1 Feb. 28, 2019

(51) Int. Cl.
| | |
|---|---|
| B62M 9/1242 | (2010.01) |
| B62M 9/127 | (2010.01) |
| B62M 9/126 | (2010.01) |
| B62M 25/02 | (2006.01) |
| B62M 9/1244 | (2010.01) |

(52) U.S. Cl.
CPC .......... *B62M 9/1242* (2013.01); *B62M 9/126* (2013.01); *B62M 9/127* (2013.01); *B62M 9/1244* (2013.01); *B62M 25/02* (2013.01)

(58) Field of Classification Search
CPC .. B62M 9/1242; B62M 9/126; B62M 9/1244; B62M 9/1248; B62M 9/127
USPC .................................................. 474/80, 82
See application file for complete search history.

(56) References Cited

U.S. PATENT DOCUMENTS

| | | | | |
|---|---|---|---|---|
| 4,618,333 A * | 10/1986 | Nagano | ............ | B62M 9/128 474/80 |
| 4,900,291 A * | 2/1990 | Patterson | ............ | B62M 9/127 474/80 |
| 5,397,273 A * | 3/1995 | Ando | ............ | B62M 9/1248 474/82 |
| 5,597,366 A * | 1/1997 | Ozaki | ............ | B62M 9/1244 474/82 |
| 5,618,241 A * | 4/1997 | Ose | ............ | B62K 23/06 474/127 |
| 5,624,335 A * | 4/1997 | Ando | ............ | B62M 9/1242 474/80 |
| 5,857,932 A * | 1/1999 | Sugimoto | ............ | B62L 1/14 188/24.22 |
| 5,860,880 A * | 1/1999 | Oka | ............ | B62M 9/1242 474/77 |
| 6,234,926 B1 * | 5/2001 | Soon | ............ | B25B 27/0071 188/24.11 |
| 6,290,621 B1 * | 9/2001 | Ichida | ............ | B62M 9/1242 411/169 |
| 6,394,921 B1 * | 5/2002 | Fukuda | ............ | B62M 9/126 474/80 |
| 7,104,908 B2 * | 9/2006 | Nagano | ............ | B62M 9/1242 474/82 |

(Continued)

*Primary Examiner* — Henry Y Liu
(74) *Attorney, Agent, or Firm* — Global IP Counselors, LLP

(57) ABSTRACT

A bicycle derailleur is basically provided with a base member, a movable member, a link structure and a cable interactive structure. The link structure is configured to movably connect the movable member relative to the base member. The cable interactive structure is provided on the link structure. The cable interactive structure includes a chain barrier portion. The chain barrier portion is configured to prevent a chain from contacting the link structure.

20 Claims, 12 Drawing Sheets

(56) References Cited

U.S. PATENT DOCUMENTS

| | | | |
|---|---|---|---|
| 7,166,048 B2 * | 1/2007 | Shahana | B62J 23/00 474/82 |
| 7,361,110 B2 * | 4/2008 | Oishi | B62M 9/1242 474/82 |
| 7,527,571 B2 * | 5/2009 | Shahana | B62M 9/1248 474/80 |
| 7,614,972 B2 * | 11/2009 | Oseto | B62M 9/1244 474/80 |
| 7,722,488 B2 * | 5/2010 | Kunisawa | B62M 9/126 474/80 |
| 7,824,285 B2 * | 11/2010 | Tan | B62M 9/127 474/80 |
| 8,012,052 B2 * | 9/2011 | Shahana | B62M 9/126 474/82 |
| 8,057,332 B2 * | 11/2011 | Takachi | B62M 9/127 474/80 |
| 8,109,848 B2 * | 2/2012 | Bohm | B62M 9/1242 403/119 |
| 8,277,346 B2 * | 10/2012 | Watarai | B62M 9/126 474/82 |
| 8,419,573 B2 * | 4/2013 | Yamaguchi | B62M 9/1242 267/155 |
| 9,033,833 B2 * | 5/2015 | Johnson | F16H 9/06 474/80 |
| 2007/0202977 A1 * | 8/2007 | Watarai | B62M 9/1242 474/82 |
| 2013/0079184 A1 * | 3/2013 | Yamaguchi | B62M 9/1248 474/80 |
| 2014/0018199 A1 * | 1/2014 | Shahana | B62M 9/121 474/82 |
| 2015/0031483 A1 * | 1/2015 | Yamaguchi | B62M 9/126 474/80 |
| 2016/0167739 A1 * | 6/2016 | Watarai | B62M 9/127 474/80 |
| 2016/0304161 A1 * | 10/2016 | Shirai | B62M 9/16 |
| 2018/0186429 A1 * | 7/2018 | Nakamura | B62M 9/124 |
| 2018/0244345 A1 * | 8/2018 | Yamaguchi | B62M 9/1244 |
| 2019/0016411 A1 * | 1/2019 | Ueda | B62M 9/125 |

* cited by examiner

BICYCLE DERAILLEUR

BACKGROUND

Field of the Invention

This invention generally relates to a bicycle derailleur. More specifically, the present invention relates to a bicycle derailleur in which interference by a link structure is substantially prevented.

Background Information

Generally, a bicycle typically uses a bicycle drive train for transmitting a pedaling force to a rear wheel. The drive train of a bicycle often uses one or two derailleurs to selectively move a bicycle chain from one of a plurality of sprockets to another for changing speeds of the bicycle.

SUMMARY

Generally, the present disclosure is directed to various features of a bicycle derailleur. In one feature, a bicycle derailleur is provided in which interference between a link structure and a chain or a cable is substantially prevented.

In view of the state of the known technology and in accordance with a first aspect of the present disclosure, a bicycle derailleur is basically provided with a base member, a movable member, a link structure and a cable interactive structure. The link structure is configured to movably connect the movable member relative to the base member. The cable interactive structure is provided on the link structure. The cable interactive structure includes a chain barrier portion. The chain barrier portion is configured to prevent a chain from contacting the link structure.

With the bicycle derailleur according to the first aspect, it is possible to increase the stability of the derailleur by preventing the chain from contacting the link structure such that the possibility of interference between the chain and the link structure is reduced.

In accordance with a second aspect of the present invention, the bicycle derailleur according to the first aspect is configured so that the chain barrier portion is configured to prevent the chain from contacting the link structure upon pedaling in a state where a chain guide is positioned at a location corresponding to a smallest rear sprocket.

With the bicycle derailleur according to the second aspect, it is possible to increase the stability of the derailleur by preventing the chain from contacting the link structure such that the possibility of interference between the chain and the link structure is reduced.

In accordance with a third aspect of the present invention, the bicycle derailleur according to the first or second aspect is configured so that the cable interactive structure includes a cable attachment structure including a cable fixing portion configured to fix a cable.

With the bicycle derailleur according to the third aspect, it is possible for the pulling force via the cable to more surely act on the link structure because the cable is fixed on the cable attachment structure provided on the link structure.

In accordance with a fourth aspect of the present invention, the bicycle derailleur according to any of the first to third aspects is configured so that the bicycle derailleur is a bicycle rear derailleur.

With the bicycle derailleur according to the fourth aspect, it is possible to increase the stability of the derailleur by preventing the chain from contacting the link structure such that the possibility of interference between the chain and the link structure is reduced.

In accordance with a fifth aspect of the present invention, the bicycle derailleur according to the fourth aspect is configured so that the cable interactive structure includes a cable attachment structure including a cable fixing portion and a cable guiding portion configured to curve a cable. The cable fixing portion is configured to fix a curved part of the cable.

With the bicycle derailleur according to the fifth aspect, it is possible to improve the stability of the derailleur by reducing the possibility that a free end of the cable (an inner wire) interferes with the link structure.

In accordance with a sixth aspect of the present invention, the bicycle derailleur according to the fourth or fifth aspect is configured to further comprise a first bushing supported by the movable member, and a second bushing supported by the movable member. The link structure includes at least one link axle having a longitudinal center axis. The first bushing and the second bushing pivotally support the at least one link axle. The first bushing and the second bushing are aligned with each other in an axial direction with respect to the longitudinal center axis of the at least one link axle.

With the bicycle derailleur according to the sixth aspect, it is possible to reduce a total weight of bicycle derailleur.

In view of the state of the known technology and in accordance with a seventh aspect of the present disclosure, a bicycle rear derailleur is basically provided with a base member, a movable member, a link structure and a cable interactive structure. The link structure is configured to movably connect the movable member relative to the base member. The cable interactive structure is provided on the link structure. The cable interactive structure includes a cable attachment structure including a cable fixing member and a cable guiding portion. The cable guiding portion is configured to curve a cable. The cable fixing member is configured to fix at least a curved part of the cable.

With the bicycle rear derailleur according to the seventh aspect, it is possible to improve the stability of the rear derailleur by reducing the possibility that a free end of the cable (an inner wire) interferes with the link structure.

In accordance with an eighth aspect of the present invention, the bicycle rear derailleur according to the seventh aspect is configured so that the cable guiding portion includes a cable guiding recess.

With the bicycle rear derailleur according to the eighth aspect, it is possible to reduce a total weight of the bicycle rear derailleur.

In accordance with a ninth aspect of the present invention, the bicycle rear derailleur according to the seventh aspect is configured so that the cable guiding portion includes a first curved cable guiding wall and a second curved cable guiding wall to define a curved cable guiding space between the first curved cable guiding wall and the second curved cable guiding wall.

With the bicycle rear derailleur according to the ninth aspect, it is possible to more accurately control curvature of the cable.

In accordance with a tenth aspect of the present invention, the bicycle rear derailleur according to the seventh aspect is configured so that the cable guiding portion includes a plurality of cable guiding projections arranged to define a curved cable guiding space.

With the bicycle rear derailleur according to the tenth aspect, it is possible to reduce a total weight of the bicycle rear derailleur.

In accordance with an eleventh aspect of the present invention, the bicycle rear derailleur according to the seventh aspect is configured so that the cable guiding portion includes a sticky part.

With the bicycle rear derailleur according to the eleventh aspect, it is possible to reduce a total weight of the bicycle rear derailleur while providing a bicycle rear derailleur that is easily manufactured.

In accordance with a twelfth aspect of the invention, the bicycle rear derailleur according to any of the seventh to eleventh aspects is configured so that the cable attachment structure further includes a cable fixing plate and a cable attachment base including the cable guiding portion. The cable fixing member is configured to engage the cable attachment base to fix the cable fixing plate on the cable attachment base so that the cable is disposed between the cable fixing plate and the cable attachment base in the cable guiding portion.

With the bicycle rear derailleur according to the twelfth aspect, it is possible to improve the stability of the derailleur by reducing the possibility that a free end of the cable (an inner wire) interferes with the link structure.

In view of the state of the known technology and in accordance with a thirteenth aspect of the present disclosure, a bicycle rear derailleur is basically provided with a base member, a movable member, a link structure, a first bushing and a second bushing. The link structure movably connects the movable member relative to the base member. The first bushing is supported by the movable member. The second bushing is supported by the movable member. The link structure includes at least one link axle having a longitudinal center axis. The first bushing and the second bushing are configured to pivotally support the at least one link axle. The first bushing and the second bushing are aligned with each other in an axial direction with respect to the longitudinal center axis of the at least one link axle.

With the bicycle rear derailleur according to the thirteenth aspect, it is possible to reduce a total weight of the bicycle rear derailleur.

In accordance with a fourteenth aspect of the present invention, the bicycle rear derailleur according to the thirteenth aspect is configured so that the first bushing is spaced apart from the second bushing in the axial direction.

With the bicycle rear derailleur according to the fourteenth aspect, it is possible to reduce a total weight of the bicycle rear derailleur.

In accordance with a fifteenth aspect of the present invention, the bicycle rear derailleur according to the thirteenth or fourteenth aspect is configured so that the movable member includes a bushing receiving portion. The bushing receiving portion includes a first bushing receiving space into which the first bushing is disposed and a second bushing receiving space into which the second bushing is disposed.

With the bicycle rear derailleur according to the fifteenth aspect, it is possible to improve the accuracy (roundness) of the receiving space.

In accordance with a sixteenth aspect of the present invention, the bicycle rear derailleur according to the fifteenth aspect is configured so that the bushing receiving portion includes a first abutment contacting the first bushing and a second abutment contacting the second bushing.

With the bicycle rear derailleur according to the sixteenth aspect, it is possible for an assembler to more easily position the first and second bushings, thereby improving assembling efficiency.

In accordance with a seventeenth aspect of the present invention, the bicycle rear derailleur according to the fifteenth or sixteenth aspect is configured so that the bushing receiving portion includes an intermediate space defined between the first bushing receiving space and the second bushing receiving space.

With the bicycle rear derailleur according to the seventeenth aspect, it is possible to reduce a total weight of the bicycle rear derailleur.

In accordance with an eighteenth aspect of the invention, the bicycle rear derailleur according to any of the fifteenth to seventeenth aspects is configured so that the link structure includes at least two link axle fixing portions. The bushing receiving portion is positioned between the at least two link axle fixing portions.

With the bicycle rear derailleur according to the eighteenth aspect, it is possible to improve the accuracy (roundness) of the receiving space.

In view of the state of the known technology and in accordance with a nineteenth aspect of the present disclosure, a bicycle derailleur is basically provided with a base member, a movable member, a link structure, a chain guide and a cable interactive structure. The link structure is configured to movably connect the movable member relative to the base member. The link structure includes at least one link member. The chain guide is provided on the movable member. The cable interactive structure is provided on the at least one link member. The cable interactive structure includes a chain barrier portion. The chain barrier portion includes a chain barrier base and a chain abutment member protruding from the chain barrier base. The chain abutment member is positioned between the chain guide and a sprocket assembly of a bicycle in a state where the bicycle derailleur is mounted to a bicycle frame of the bicycle.

With the bicycle derailleur according to the nineteenth aspect, it is possible to increase the stability of the derailleur by preventing the chain from contacting the link structure such that the possibility of interference between the chain and the link structure is reduced.

In accordance with a twentieth aspect of the present invention, the bicycle derailleur according to the nineteenth aspect is configured so that the chain abutment member is configured to extend in an earthward direction in a state in which the bicycle derailleur is mounted to the bicycle frame of the bicycle and the bicycle is traveling on the ground.

With the bicycle derailleur according to the twentieth aspect, it is possible to increase the stability of the derailleur by preventing the chain from contacting the link structure such that the possibility of interference between the chain and the link structure is reduced.

Also, other objects, features, aspects and advantages of the disclosed bicycle derailleur will become apparent to those skilled in the art from the following detailed description, which, taken in conjunction with the annexed drawings, discloses several embodiments of the bicycle derailleur.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
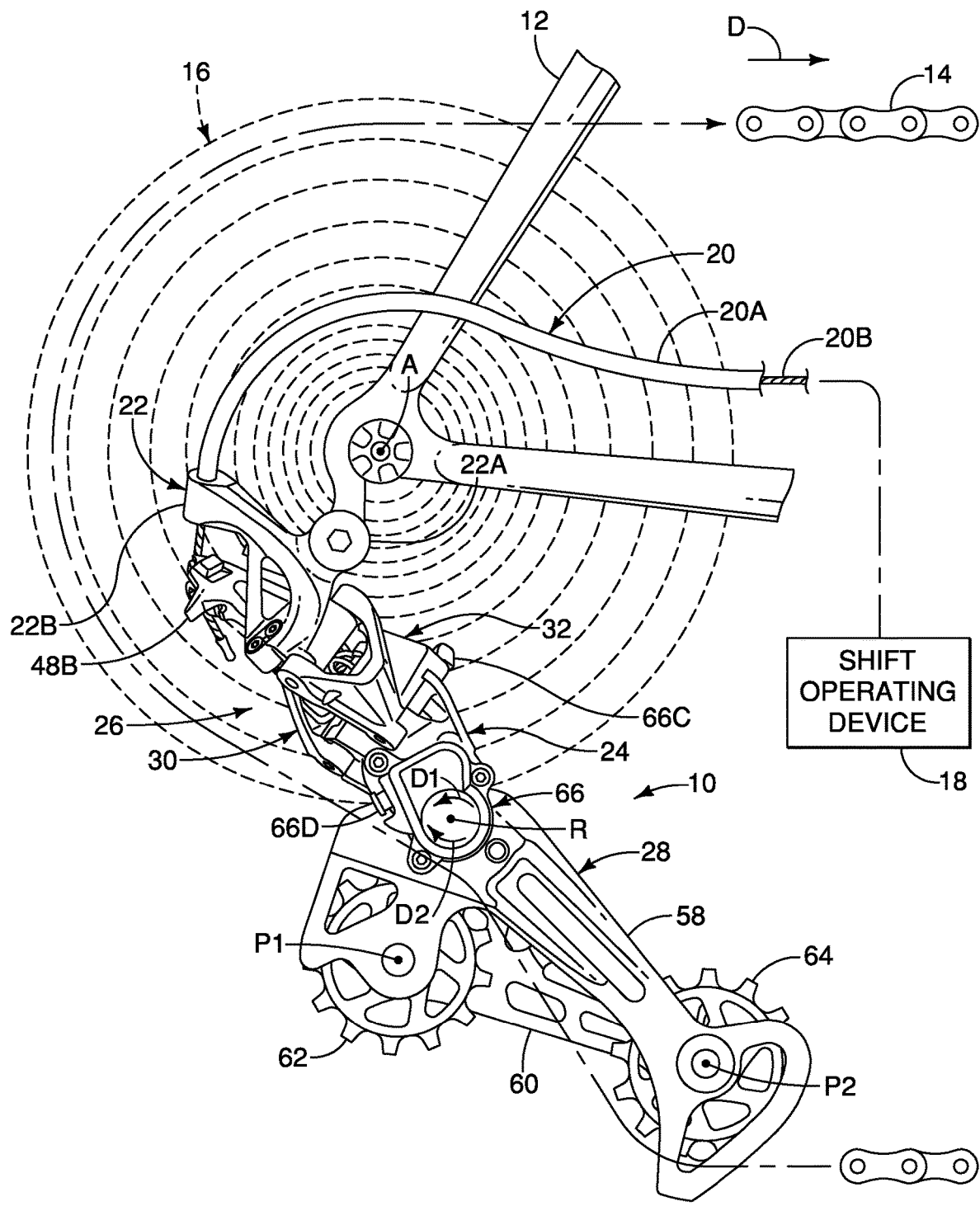
FIG. 1 is a side elevational view of a rear portion of a bicycle frame equipped with a rear sprocket assembly and a rear derailleur in accordance with one illustrated embodiment in which the rear derailleur is in a low shift stage position.

Selected embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Although the following description refers to a bicycle rear derailleur, the exemplary embodiments of the present invention are equally applicable to a bicycle front derailleur.

Referring initially to FIGS. 1 to 6, a bicycle derailleur is a bicycle rear derailleur 10 mounted to a portion of a bicycle frame 12 of a bicycle. A bicycle chain 14 is selectively engaged with at least one rear sprocket 16 of a rear sprocket assembly in a conventional manner. In the illustrated embodiment, the rear sprocket assembly preferably includes a plurality of the rear sprockets 16. The bicycle chain 14 extends from a front sprocket (not shown) to one of the rear sprockets 16 in a chain running direction D in a conventional manner. The bicycle chain 14 is illustrated as a roller chain having a plurality of inner and outer links, respectively, that alternate in the chain running direction D. The bicycle chain 14 is configured to meshingly engage with the teeth of the front sprocket and the rear sprocket 16.

The rear derailleur 10 is configured to shift the bicycle chain 14 between the plurality of rear sprockets 16 of the rear sprocket assembly. The rear sprockets 16 are mounted on a sprocket supporting member (not shown) of a bicycle rear wheel (not shown) in a conventional manner to selectively transmit drive torque to a bicycle rear hub body of the bicycle rear wheel (not shown). A rotational center axis of the rear sprockets 16 are coaxially arranged with a rotational center axis A of the bicycle rear hub body. The rear sprockets 16 are part of a conventional rear sprocket assembly, and thus, the rear sprockets will not be further discussed in detail herein.

The rear derailleur 10 will now be discussed with reference to FIGS. 1 to 13. The rear derailleur 10 is operatively coupled to a shift operating device 18 via a control cable 20 in a conventional manner. The control cable 20 is preferably a conventional Bowden type cable having a protective outer casing 20A and an inner wire 20B. The bicycle rear derailleur 10 comprises a base member 22, a movable member 24 and a link structure 26. As shown in FIG. 1, the bicycle rear derailleur 10 further comprises a chain guide 28 provided on the movable member 24. As best shown in FIGS. 4 and 10 to 12, the link structure includes at least one link member. Preferably, the link structure 26 includes a first, or inner, link member 30 and a second, or outer, link member 32. The movable member 24, the link structure 26 and the chain guide 28 are configured to pivot relative to the base member 22 to shift the bicycle chain 14 between the rear sprockets 16 of the rear sprocket assembly.

The base member 22 is configured to be mounted to the bicycle frame 12. In particular, the base member 22 is configured to be releasably mounted to the bicycle frame 12. The base member 22 is a rigid member made of a suitable material, such as a metallic material or a fiber reinforced plastic material. The base member 22 includes a bracket axle portion 22A and an outer casing support portion 22B. The bracket axle portion 22A is mounted to a hanger portion of the bicycle frame 12 via a mounting bolt. The outer casing support portion 22B supports one end of the outer casing 20A of the control cable 20. Preferably, the base member 22 is integrally formed as a one-piece, unitary member.

Figure 9:
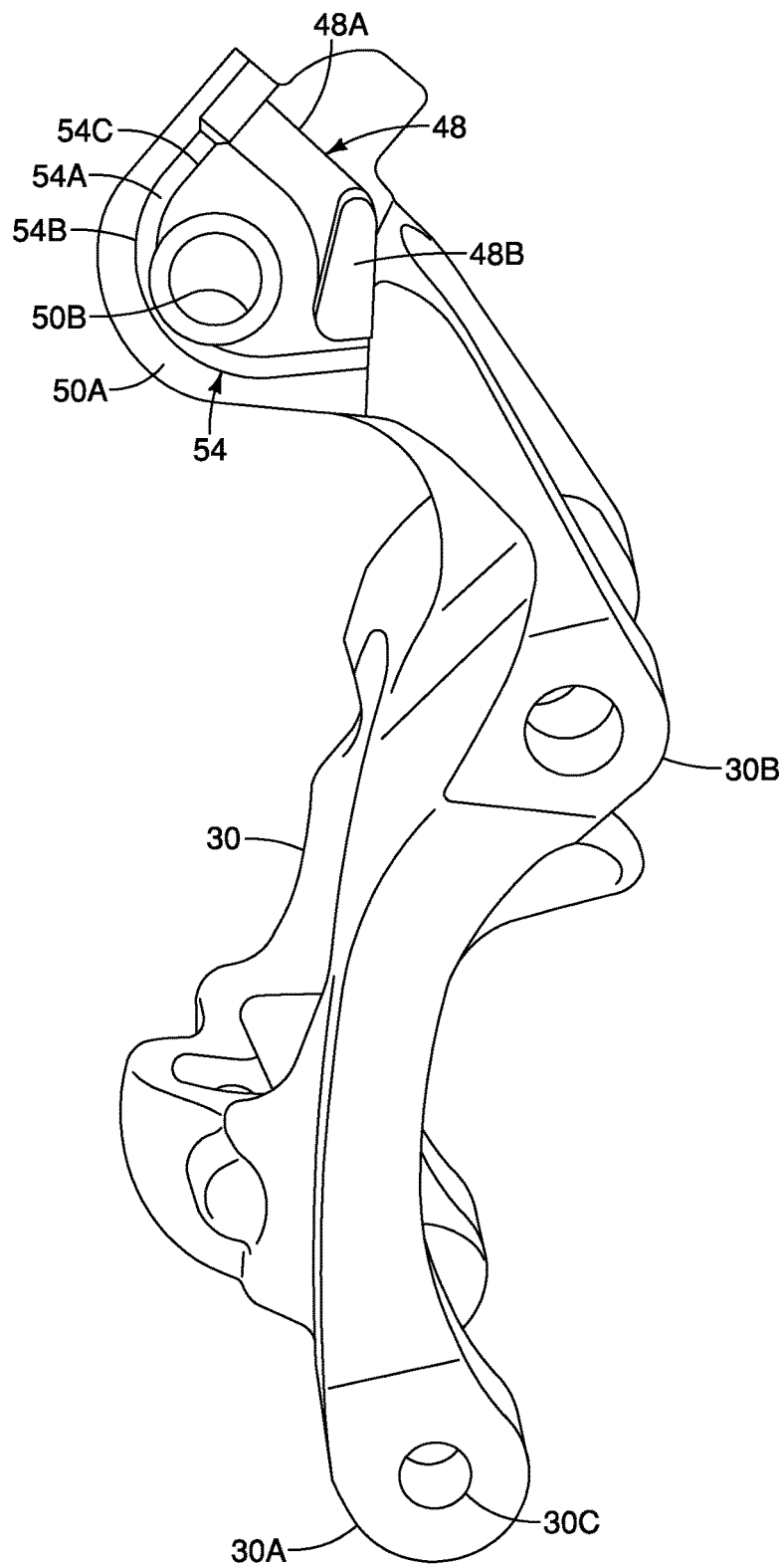
FIG. 9 is a perspective view of the first link member of FIG. 7.
Figure 10:
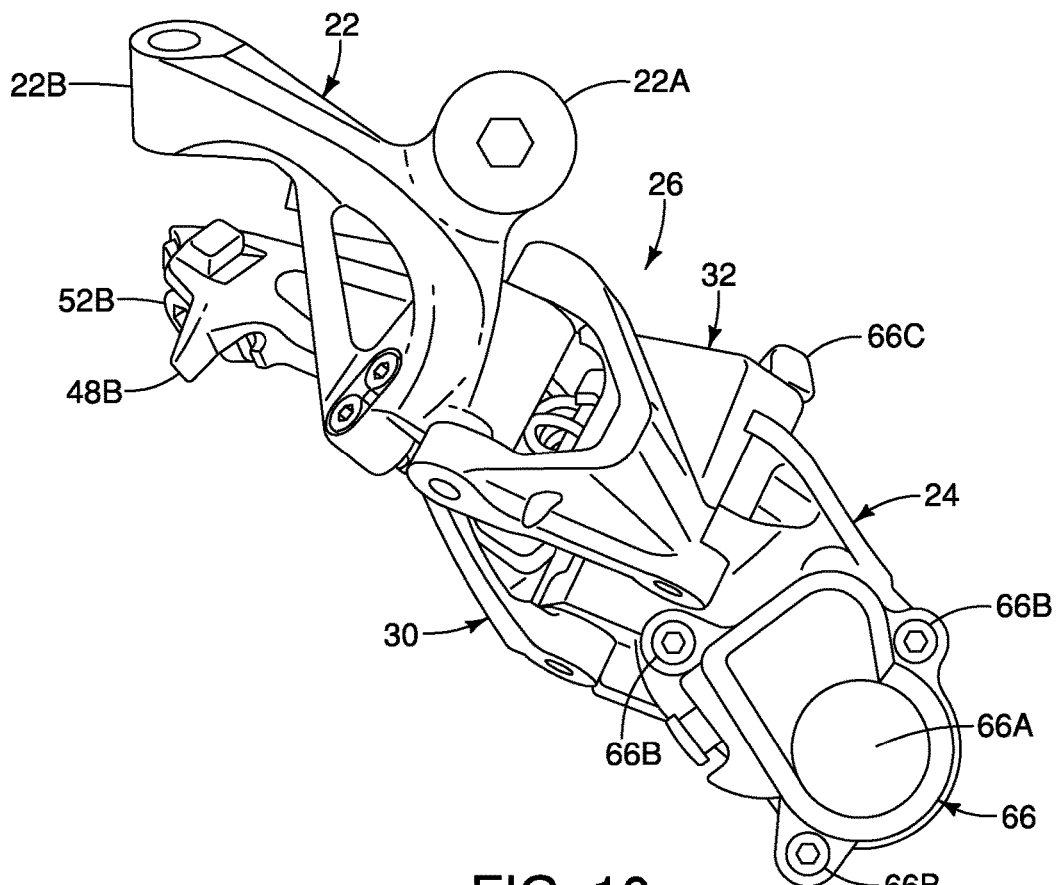
FIG. 10 is a side elevational view of the bicycle rear derailleur of FIG. 1 removed from the bicycle frame for clarity.
Figure 11:
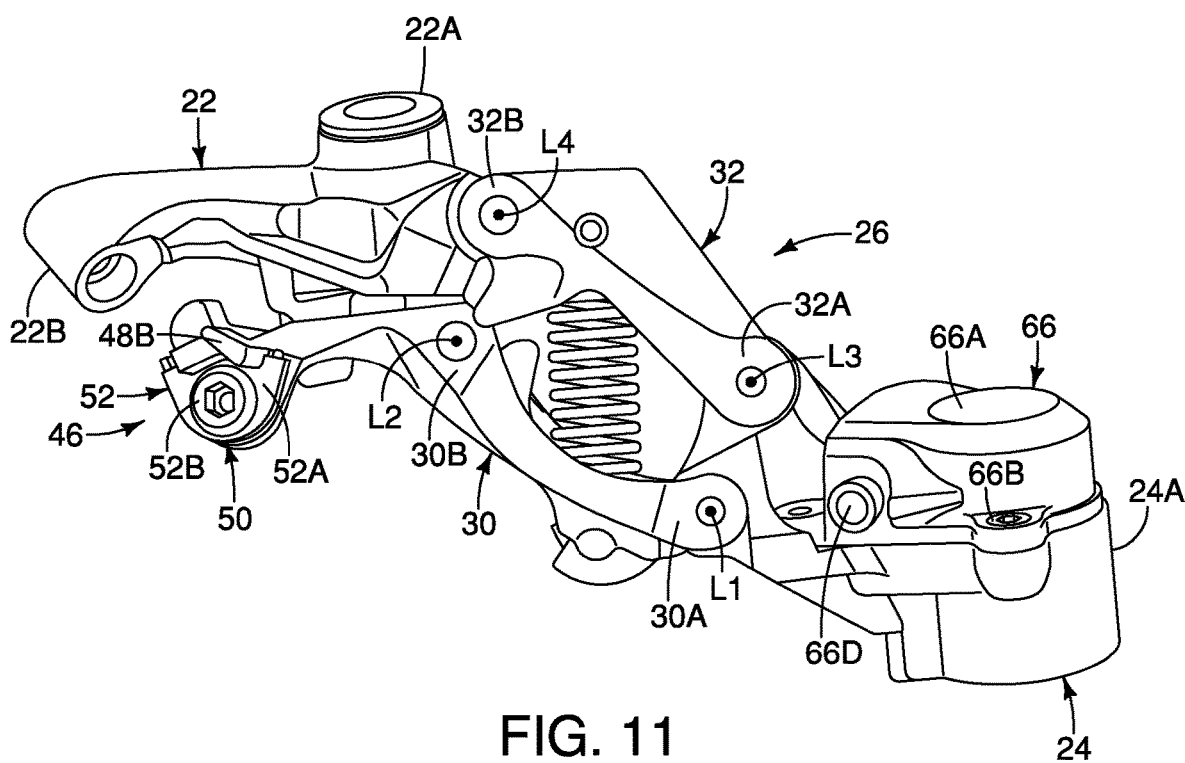
FIG. 11 is a top plan view of the bicycle rear derailleur of FIG. 10.

As shown in FIGS. 1 to 12, the link structure 26 is configured to movably connect the movable member 24 relative to the base member 22. A first part 30A of the first link member 30 of the link structure 26 is pivotally attached to the movable member 24 by a first link axle 34 that defines a first link axis L1. A second part 30B of the first link member 30 is pivotally attached to the base member 22 by a second link axle 36 that defines a second link axis L2. In other words, the first link member 30 is pivotally connected to the movable member 24 about the first link axis L1 and pivotally connected to the base member 22 about the second link axis L2, as shown in FIG. 11. The second link axis L2 is substantially parallel to the first link axis L1. A first part 32A of the second link member 32 of the link structure 26 is pivotally attached to the movable member 24 by a third link axle 38. A second part 32B of the second link member 32 is pivotally attached to the base member 22 by a fourth link axle 40. In other words, the second link member 32 is pivotally connected to the movable member 24 about the third link axis L3 and pivotally connected to the base member 22 about the fourth link axis L4, as shown in FIG. 11. Thus, the base member 22, the movable member 24, the first link member 30 and the second link member 32 form a four-bar linkage arranged to move the chain guide 28 laterally between a plurality of shift positions (e.g., a first position and a second position) in a conventional manner.

Figure 12:
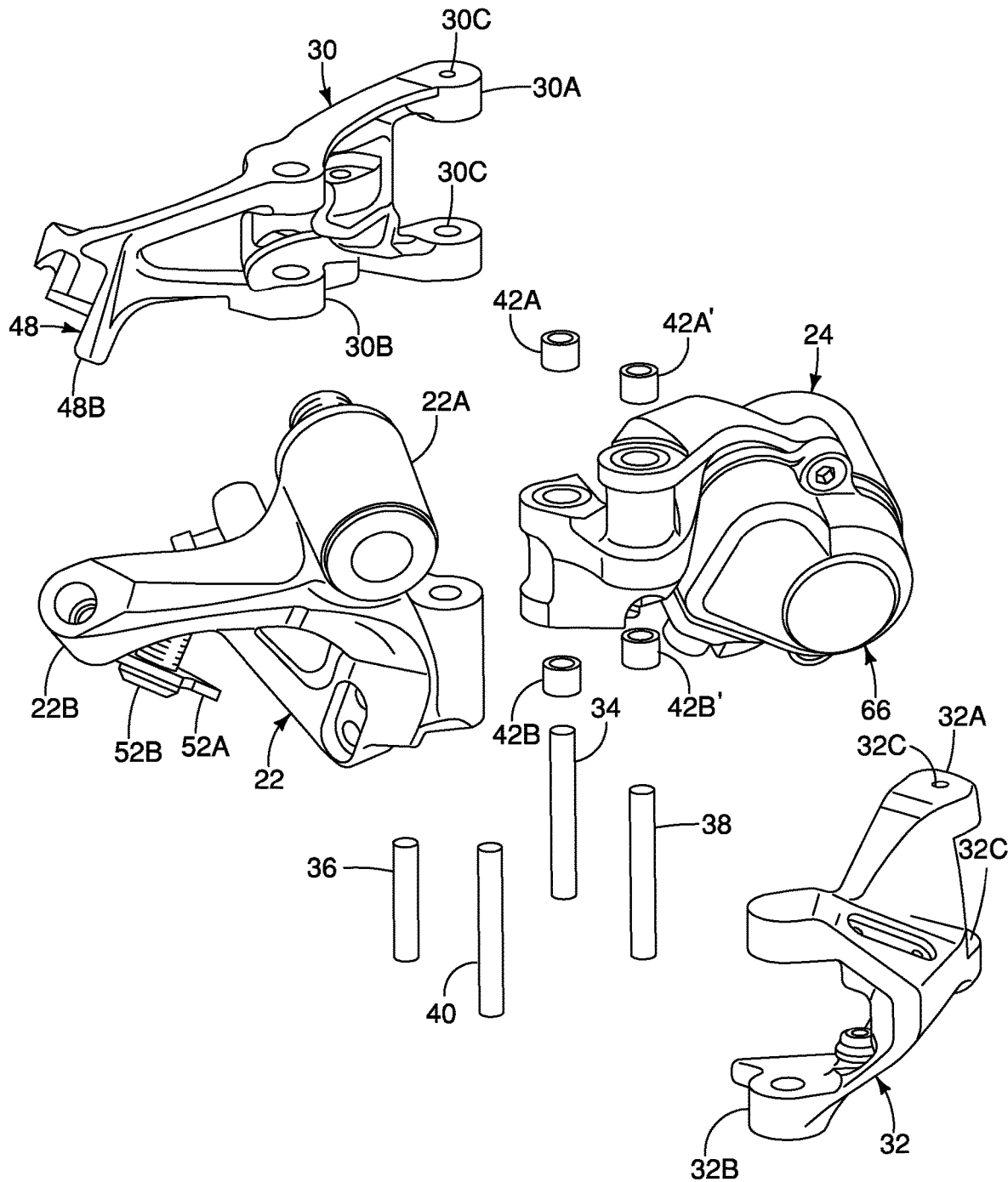
FIG. 12 is an exploded perspective view of the bicycle rear derailleur of FIGS. 10 and 11.
Figure 13:
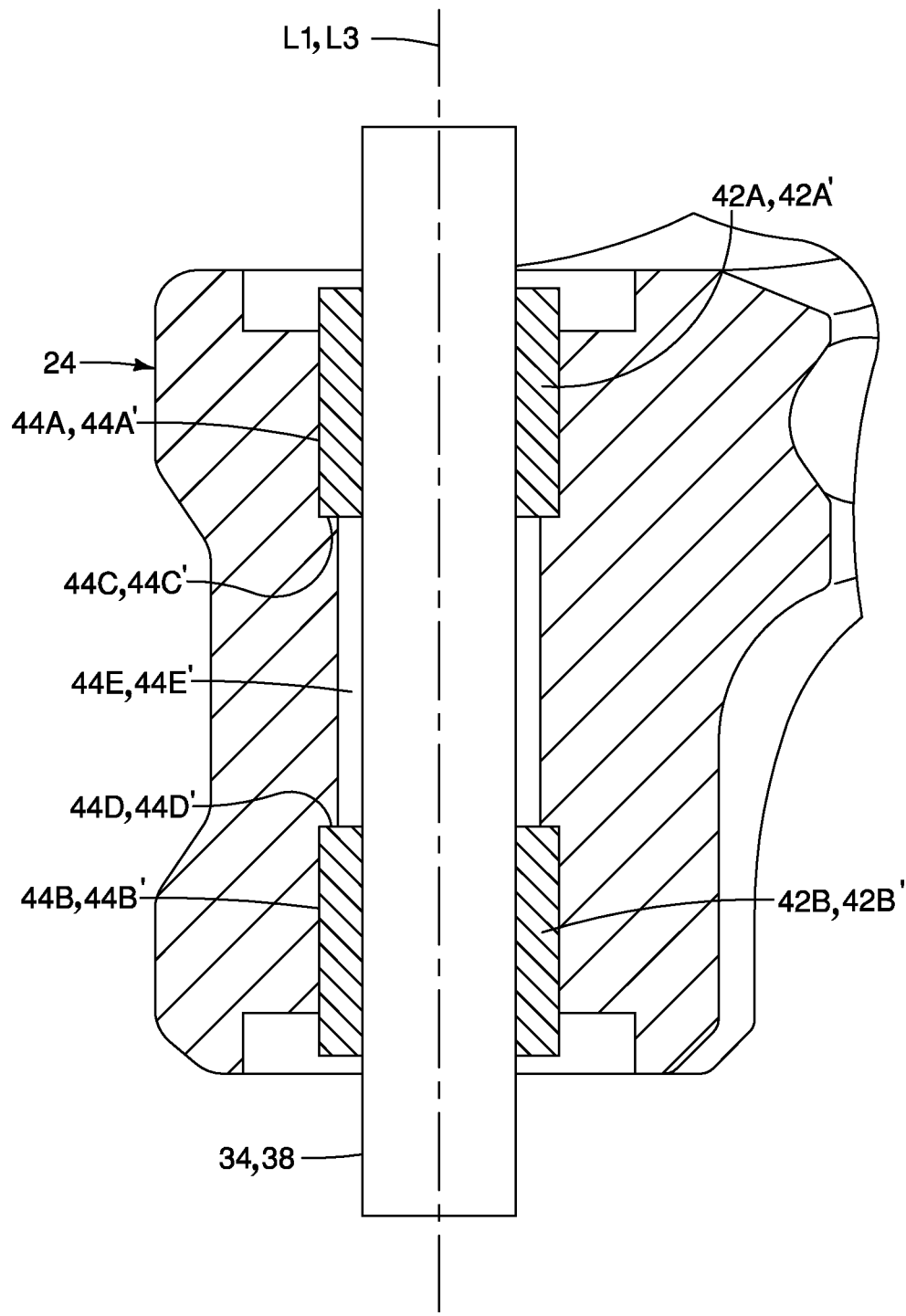
FIG. 13 is an elevational view in cross section of a link axle of the movable member of FIG. 11.

As shown in FIGS. 12 and 13, a first bushing 42A is supported by the movable member 24, and a second bushing 42B is supported by the movable member 24. The movable member 24 includes a bushing receiving portion. The bushing receiving portion includes a first bushing receiving space 44A into which the first bushing 42A is disposed and a second bushing receiving space 44B into which the second bushing 42B is disposed. The bushing receiving portion includes a first abutment 44C that the first bushing 42A contacts and a second abutment 44D that the second bushing 42B contacts. The first and second abutments 44C and 44D facilitate properly locating the first and second bushings 42A and 42B during assembly. The bushing receiving portion includes an intermediate space 44E defined between the first bushing receiving space 44A and the second bushing receiving space 44B.

The link structure 26 includes at least one link axle having a longitudinal center axis, such as the first link axle 34 having the first link axis L1. The first bushing 42A and the second bushing 42B are configured to pivotally support the at least one link axle, such as the first link axle 34. In other words, the first bushing 42A and the second bushing 42B pivotally support the at least one link axle, such as the first link axle 34. The first bushing 42A and the second bushing 42B are aligned with each other in the axial direction with respect to the longitudinal center axis (first link axis L1) of the at least one link axle (first link axle 34), as shown in FIG. 13.

As shown in FIG. 13, the first bushing 42A is spaced apart from the second bushing 42B in the axial direction with the intermediate space 44E disposed therebetween. Preferably, the intermediate space 44E does not have a bushing disposed therein. The first and second abutments 44C and 44D are preferably defined by inwardly extending shoulders, such that the diameter of the intermediate space 44E is less than the diameters of the first and second bushing receiving spaces 44A and 44B.

The link structure 26 includes at least two link axle fixing portions. As shown in FIG. 12, the first link member 30 of the link structure 26 includes at least two link axle fixing portions 30C. The bushing receiving portion is positioned between the at least two link axle fixing portions 30C. This configuration achieves good roundness of the insertion openings for the bushings, which reduces clearance between the bushings and a circumferential surface of the insertion openings.

As shown in FIGS. 12 and 13, a first bushing 42A' is supported by the movable member 24, and a second bushing 42B' is supported by the movable member 24. The movable member 24 includes a bushing receiving portion. The bushing receiving portion includes a first bushing receiving space 44A' into which the first bushing 42A' is disposed and a second bushing receiving space 44B' into which the second bushing 42B' is disposed. The bushing receiving portion includes a first abutment 44C' that the first bushing 42A' contacts and a second abutment 44D' that the second bushing 42B' contacts. The first and second abutments 44C' and 44D' facilitate properly locating the first and second bushings 42A' and 42B' during assembly. The bushing receiving portion includes an intermediate space 44E' defined between the first bushing receiving space 44A' and the second bushing receiving space 44B'.

The link structure 26 includes at least one link axle having a longitudinal center axis, such as the third link axle 38 having the third link axis L3. The first bushing 42A' and the second bushing 42B' are configured to pivotally support the at least one link axle, such as the third link axle 38. In other words, the first bushing 42A' and the second bushing 42B' pivotally support the at least one link axle, such as the first link axle 34. The first bushing 42A' and the second bushing 42B' are aligned with each other in the axial direction with respect to the longitudinal center axis (third link axis L3) of the at least one link axle (third link axle 38), as shown in FIG. 13.

As shown in FIG. 13, the first bushing 42A' is spaced apart from the second bushing 42B' in the axial direction with the intermediate space 44E' disposed therebetween. Preferably, the intermediate space 44E' does not have a bushing disposed therein. The first and second abutments 44C' and 44D' are preferably defined by inwardly extending shoulders, such that the diameter of the intermediate space 44E' is less than the diameters of the first and second bushing receiving spaces 44A' and 44B'.

The link structure 26 includes at least two link axle fixing portions. As shown in FIG. 12, the second link member 32 of the link structure 26 includes at least two link axle fixing portions 32C. The bushing receiving portion is positioned between the at least two link axle fixing portions 32C. This configuration achieves good roundness of the insertion openings for the bushings, which reduces clearance between the bushings and a circumferential surface of the insertion openings.

Bearing structures for the link axles 36 and 40 are conventional, thus the explanations thereof are omitted for the sake of brevity. However, the bearing structures of the link axles 36 and 40 can be similarly configured to the bearing structures of the first link axle 34 and the third link axle 38. Additionally, either one of the bearing structures of the first link axle 34 or the third link axle 38 can be omitted.

Figure 2:
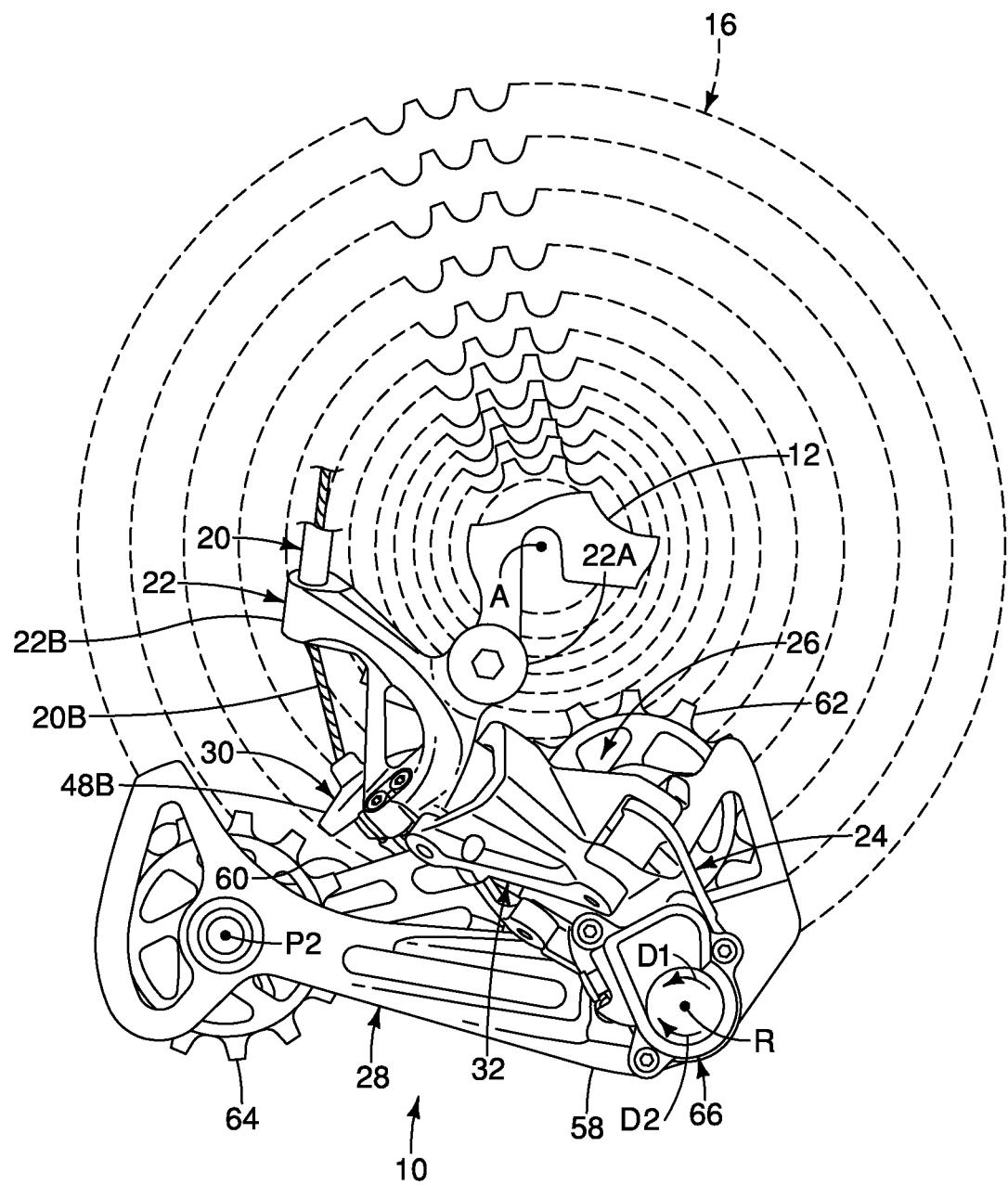
FIG. 2 is a side elevational view of the bicycle rear derailleur of FIG. 1 with the rear derailleur in a top shift stage position.
Figure 3:
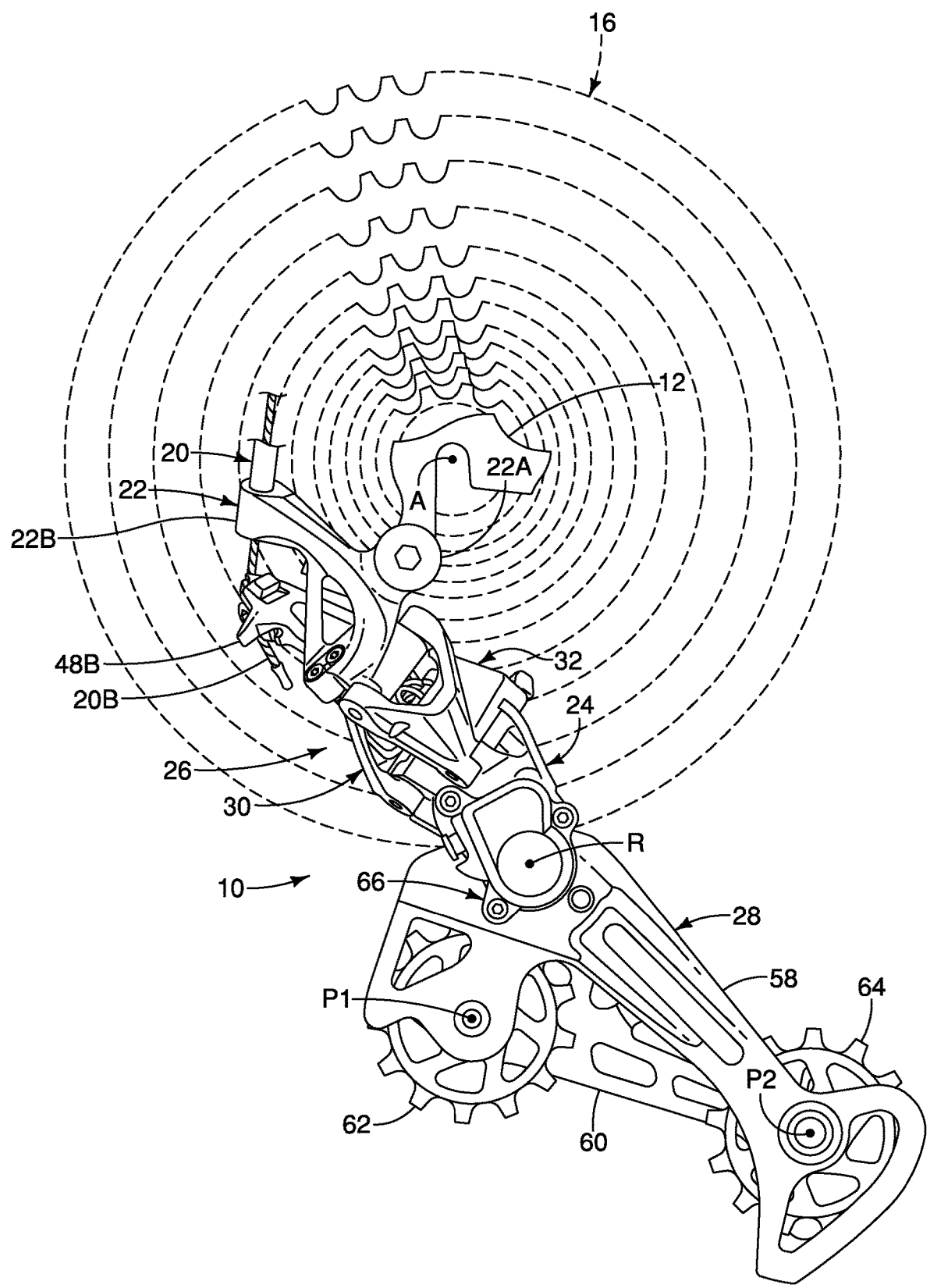
FIG. 3 is a side elevational view of the bicycle rear derailleur of FIG. 1 with the rear derailleur in a low shift stage position.

As shown in FIGS. 1 to 12, the bicycle derailleur 10 further includes a cable interactive structure 46 provided on the link structure 26. Preferably, the bicycle derailleur 10 includes the cable interactive structure 46 provided on the at least one link member. The cable interactive structure 46 includes a chain barrier portion 48. The chain barrier portion 48 includes a chain barrier base 48A and a chain abutment member 48B protruding from the chain barrier base 48A. The chain abutment member 48B is positioned between the chain guide 28 and the sprocket assembly of the bicycle in a state where the bicycle derailleur 10 is mounted to the bicycle frame 12 of the bicycle. The chain abutment member 48B is configured to extend in an earthward direction, as shown in FIGS. 1 and 3, in a state in which the bicycle derailleur 10 is mounted to the bicycle frame 12 of the bicycle and the bicycle is traveling on the ground. Preferably, the chain barrier portion 48 is integrally formed as a one-piece member with the first link member 30.

Figure 6:
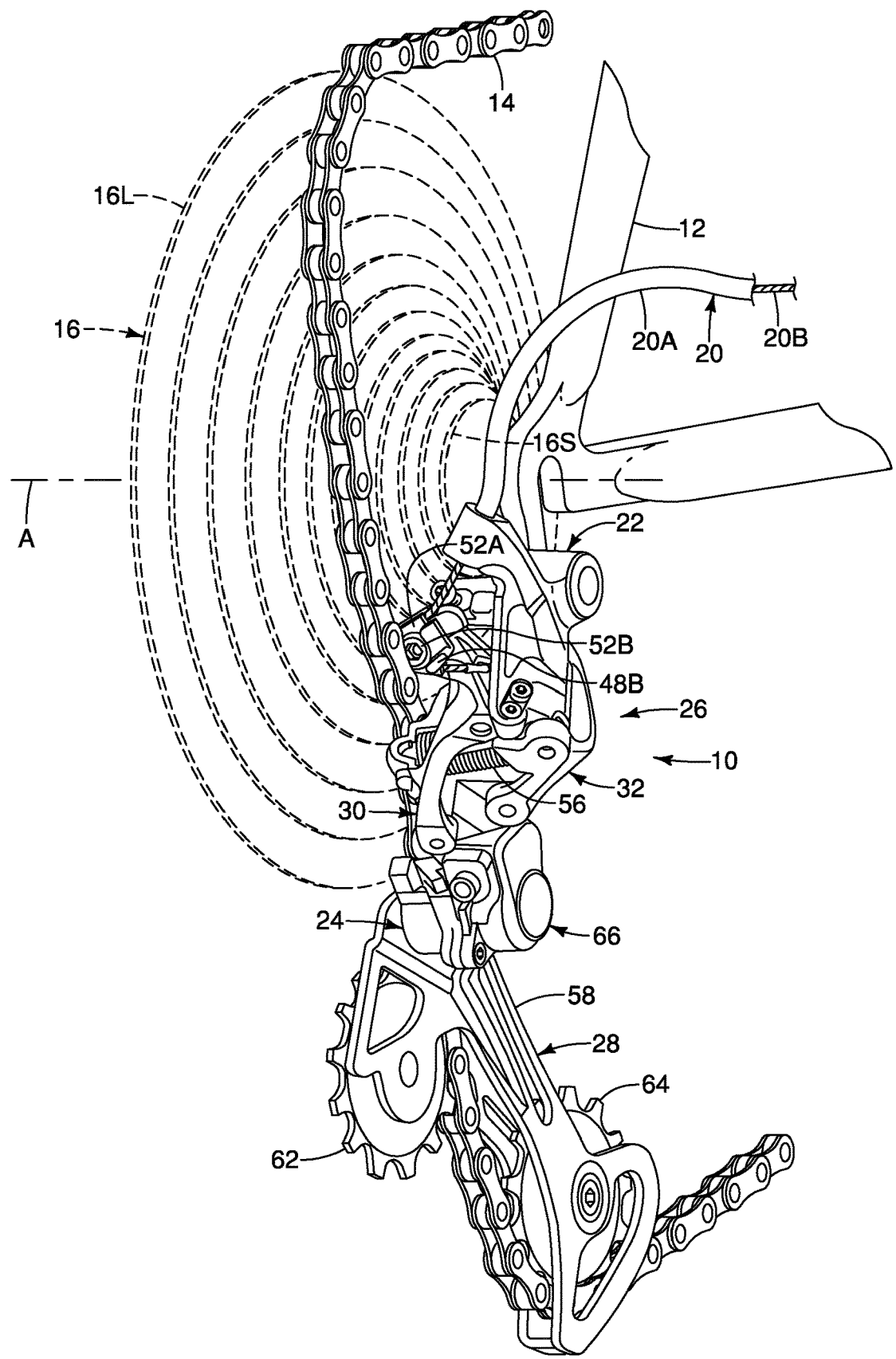
FIG. 6 is a perspective view of the bicycle rear derailleur of FIG. 1 in the low shift stage position.

The chain barrier portion 48 is configured to prevent a chain 14 from contacting the link structure 26. In other words, the chain barrier portion 48 is configured to prevent the chain from contacting the link structure 26 upon pedaling in a state where the chain guide 28 is positioned at a location corresponding to a smallest rear sprocket 16S, as shown in FIG. 6. In a configuration without a chain barrier portion, when the chain guide is shifted from a shift position corresponding to a relatively smaller rear sprocket from a shift position corresponding to a relatively larger rear sprocket before the chain starts moving, the chain contacts a lower side of the inner link member. Such shifting can cause the chain to get stuck with the inner link member such that engagement between the chain and the rear sprocket is incomplete, and the chain cannot recover from this situation. By providing a rear derailleur 10 with a chain barrier portion 48, as shown in FIG. 6, the chain 14 contacts the chain barrier portion 48 and is prevented from moving toward the first link member 30 as in configurations without the chain barrier portion. The chain barrier portion 48 can also be a pin member and a head of an inner wire fixing bolt.

Figure 5:
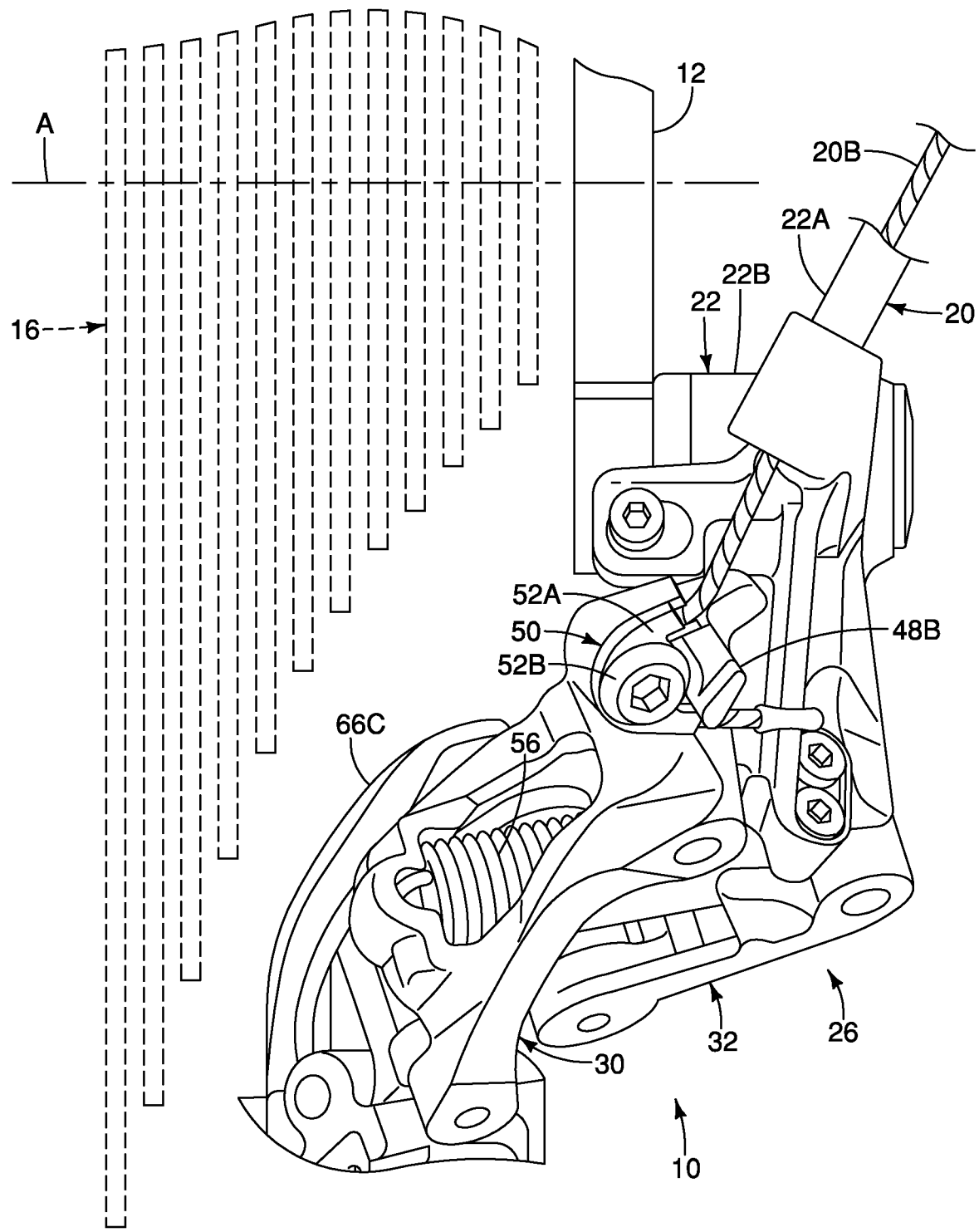
FIG. 5 is an enlarged rear elevational view of the bicycle rear derailleur of FIG. 4.
Figure 7:
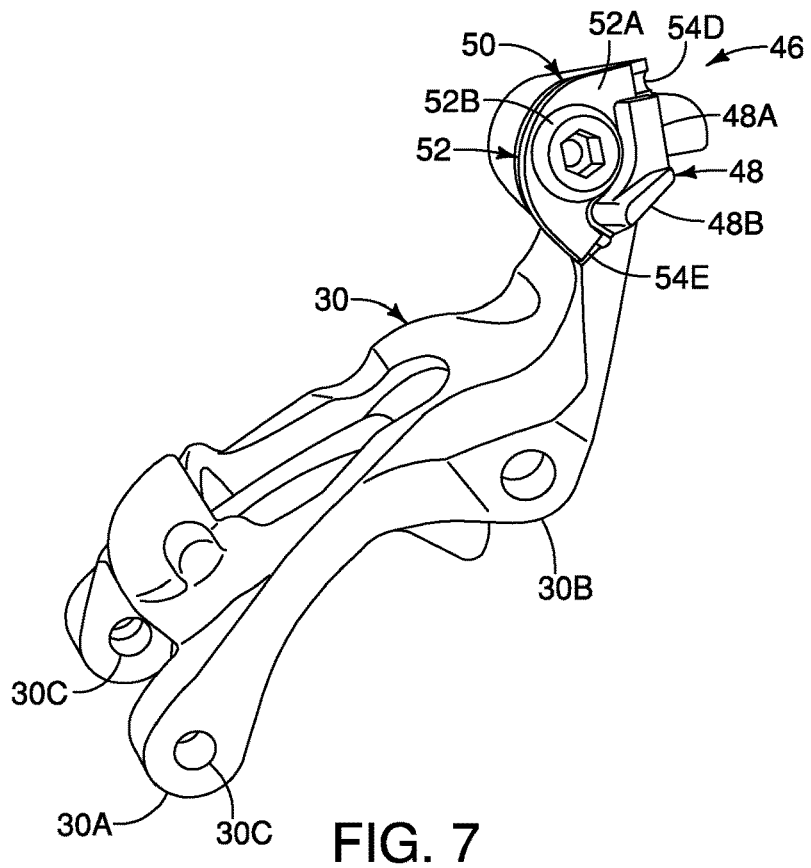
FIG. 7 is a perspective view of a first link member of the link structure and a cable interactive structure of the bicycle rear derailleur of FIGS. 1 to 6.

The cable interactive structure 46 further includes a cable attachment structure 50 including a cable fixing portion 52 configured to fix the cable 20, as shown in FIGS. 5 and 7.

Figure 8:
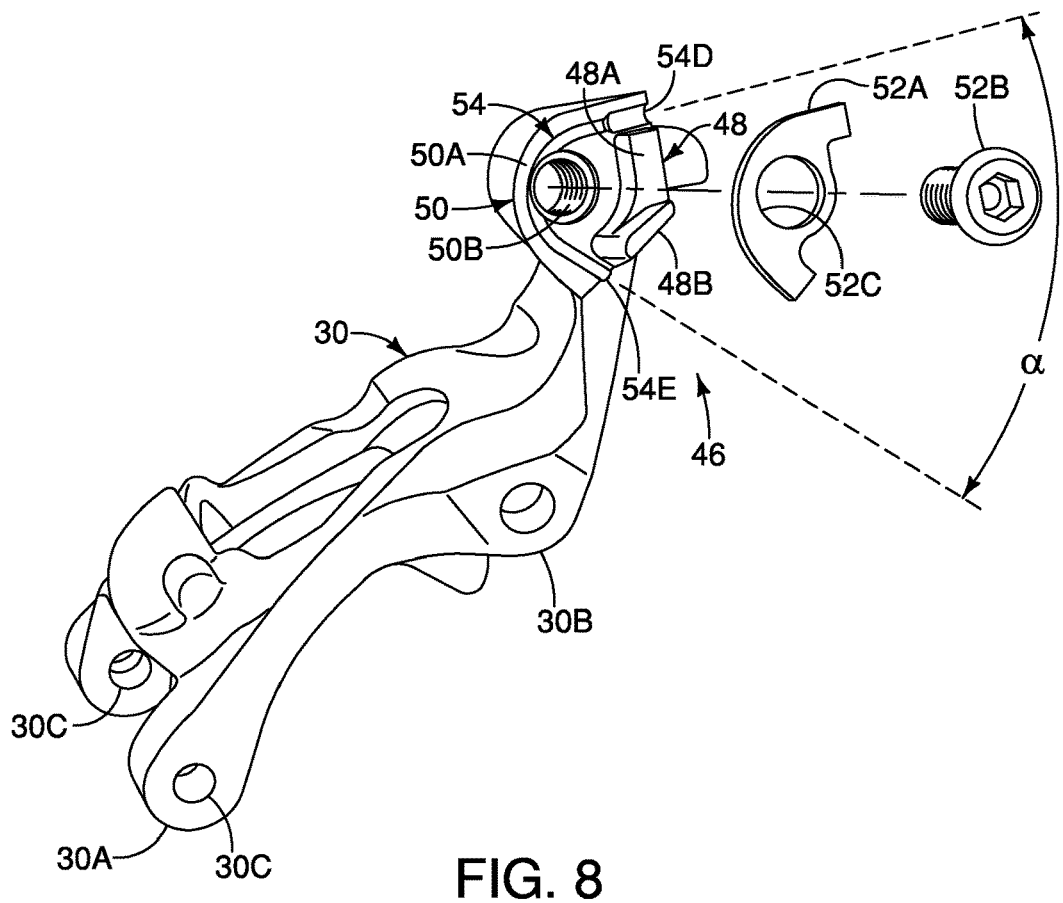
FIG. 8 is an exploded assembly view of the first link member and the cable interactive structure of FIG. 7.

The cable attachment structure 50 further includes a cable guiding portion 54 configured to curve the cable 20 such that the cable fixing portion is configured to fix a curved part of the cable, as shown in FIGS. 8 and 9. In other words, the cable interactive structure 46 includes a cable attachment structure 50 including a cable fixing member 52B and a cable guiding portion 54. The cable guiding portion 54 is configured to curve the cable 20. The cable fixing member 52B is configured to fix at least a curved part of the cable 20. By curving the cable 20, as shown in FIGS. 4 and 5, interference between an end of the cable 20 and the link structure 26 is substantially prevented.

The cable guiding portion 54 of the cable attachment structure 50 includes a cable guiding recess 54A, as shown in FIGS. 8 and 9, which is configured to receive and guide the inner wire 20B of the cable 20. The recess 54A of the cable guiding portion 54 includes a first curved cable guiding wall 54B and a second curved cable guiding wall 54C to define a curved cable guiding space between the first curved cable guiding wall 54B and the second curved cable guiding wall 54C. As shown in FIG. 8, an angle α is formed between a cable entry portion 54D and a cable exit portion 54E of the cable guiding recess 54A. Preferably, the angle α is approximately 140 degrees.

The cable fixing portion 52 of the cable attachment structure 50 includes a cable fixing plate 52A and the cable fixing member 52B, as shown in FIGS. 7 and 8. As shown in FIG. 8, the cable attachment structure 50 includes a cable attachment base 50A, which includes the cable guiding portion 54. The cable fixing member 52B is configured to engage with the cable attachment base 50A to fix the cable fixing plate 52A on the cable attachment base 50A so that the cable 20 (FIGS. 1 and 5) is disposed between the cable fixing plate 52A and the cable attachment base 50A in the cable guiding portion 54. As shown in FIG. 8, the cable fixing member 52B is preferably a threaded fastener received by a threaded opening 50B in the cable attachment base 50A. The cable fixing plate 52A has an opening 52C aligned with the threaded opening 50B in the cable attachment base 50A to facilitate receiving the cable fixing member 52B. Preferably, as shown in FIG. 7, the cable fixing plate 52A covers substantially an entirety of the cable guiding recess 54A from the cable entry portion 54D to the cable exit portion 54E.

Figure 4:
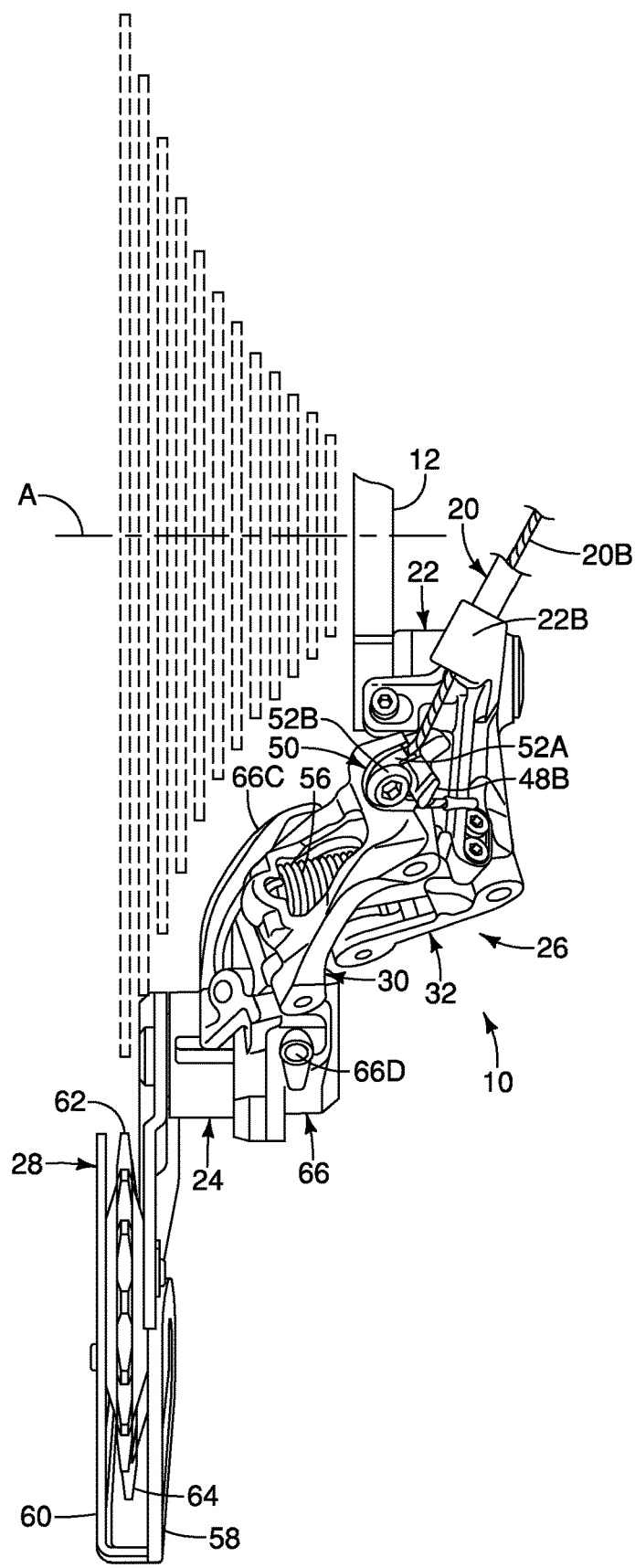
FIG. 4 is a rear elevational view of the bicycle rear derailleur of FIG. 3 in the low shift stage position.

As best seen in FIGS. 4 to 6, the link structure 26 further includes a biasing member 56 that is interposed between the first link member 30 and the second link member 32 to bias the movable member 24 towards one of a top shift stage position (FIG. 2) and a low shift stage position (FIGS. 1, 3, 4 and 6). The biasing member 56 is preferably a coil tension spring that biases the movable member 24 towards the top shift stage position. As used herein, the term "top shift (gear) stage position" refers to the rear derailleur 10 being in an operating position that corresponds to the bicycle chain 14 being guided onto the one of the rear sprockets 16S with the smallest number of teeth that is located farthest away from a center longitudinal plane of the bicycle frame. As used herein, the term "low shift (gear) stage position" refers to the rear derailleur 10 being in an operating position that corresponds to the bicycle chain 14 being guided onto the one of the rear sprockets 16S with the largest number of teeth that is located closest to the center longitudinal plane of the bicycle frame. The inner wire 20B is operable by the shift operating device 18 to shift the chain guide 28 between the top and low gear positions via operation of the shift operating device 18.

The movable member 24 is movably coupled to the base member 22. The movable member 24 is movably coupled to the base member 22 by the link structure 26. The chain guide 28 is pivotally mounted to the movable member 24 so that the chain guide 28 can pivot about a rotational axis R. The movable member 24 is a rigid member made of a suitable material, such as a metallic material or a fiber reinforced plastic material.

The chain guide 28 is pivotally mounted to the movable member 24 about the rotational axis R in a conventional manner with a biasing member, such as a torsion spring (not shown), interposed therebetween. In this way, the chain guide 28 pivots relative to the movable member 24. The chain guide 28 cooperates with the movable member 24 to create tension in the bicycle chain 14 as the rear derailleur 10 moves parallel to the sprocket axis A during a shifting operation. The chain guide 28 basically includes a first, or outer, chain cage plate 58, a second, or inner, chain cage plate 60, a first, or guide, pulley 62 and a second, or tension, pulley 64. The chain cage plates 58 and 60 define a chain receiving slot for receiving the bicycle chain 14. The first and second pulleys 62 and 64 are both rotatably disposed between the chain cage plates 58 and 60. The first pulley 62 has a first rotational pulley axis P1. The second pulley 64 has a second rotational pulley axis P2. The rotational axis R is substantially parallel to the first and second rotational pulley axes P1 and P2.

A resistance applying structure 66 is attached to the movable member 24, as shown in FIGS. 1 to 4, 6 and 10 to 12, to substantially prevent chain bounce and to maintain the desired chain tension of the bicycle chain 14 during riding. In particular, the resistance applying structure 66 is provided such that when the chain guide 28 rotates in a predetermined direction, the resistance of the movement of the chain guide 28 in the predetermined direction is increased. In the illustrated embodiment, the chain guide 28 pivots about the rotational axis R in the predetermined direction, which corresponds to a first rotational direction D1 (as shown in FIGS. 1 and 2). The first rotational direction D1 corresponds to a counterclockwise direction about the rotational axis R as viewed from a non-frame facing side of the rear derailleur. The chain guide 28 is biased in a second rotational direction D2 about the rotational axis R. The second rotational direction D2 opposite the first rotational direction D1 with respect to the rotational axis R.

The resistance applying structure 66 preferably includes a one-way clutch (not shown) and a friction applying element (not shown). The one-way clutch applies resistance to rotational movement of the chain guide 28 in a predetermined direction. The friction applying element applies frictional resistance to rotational movement of the chain guide 28 by applying frictional resistance to the rotation of the one-way clutch. Basically, the resistance applying structure 66 only applies a frictional resistance to the rotation of the chain guide 28 via the one-way clutch when the chain guide 28 pivots in the first rotational direction D. The one-way clutch disconnects the resistance applying structure 66 when the chain guide pivots in the second rotational direction. A protective cover 66A is mounted to a resistance applying structure mounting flange 24A of the movable member through fasteners 66B to protect components of the resistance applying structure, as shown in FIGS. 10 and 11.

The resistance applying structure 66 includes a friction switch lever 66C and an adjustment screw 66D, as shown in FIGS. 1, 4, 5, 10 and 11. Preferably, the frictional resistance (that is, rotational resistance) applied by the resistance applying structure 66 is adjustable. By operating the friction switch lever 66C and/or adjusting the adjustment screw 66D, the user can adjust a degree of frictional resistance applied by the resistance applying structure 66 to the chain guide 28. Basically, the friction switch lever 66C acts as an ON/OFF switch, while the adjustment screw 66D provides a fine adjustment of the level of frictional resistance. The friction switch lever 66C is movable between a first position (an ON position) in which frictional resistance is applied to the chain guide 28, and a second position (an OFF position) in which substantially zero frictional resistance is applied to the chain guide 28.

Figure 14:
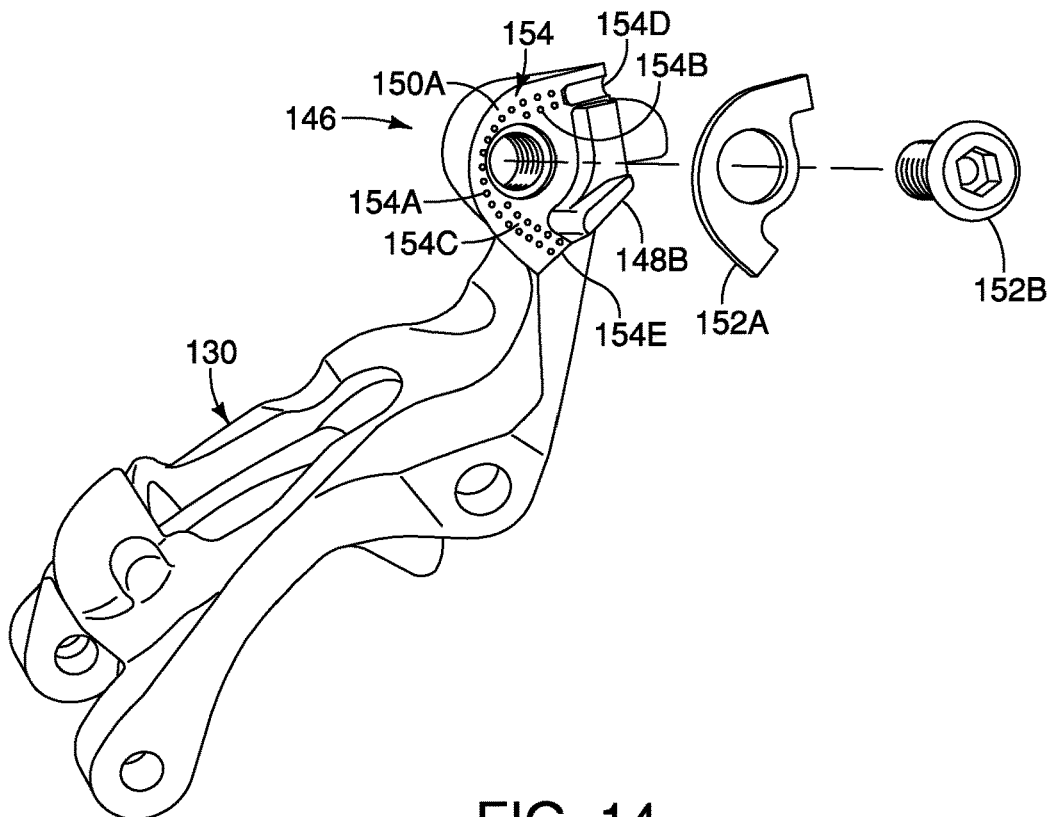
FIG. 14 is an exploded assembly view of a link structure of a bicycle rear derailleur in accordance with another illustrated embodiment.

As shown in FIG. 14, a link structure of a bicycle rear derailleur in accordance with another illustrated exemplary embodiment of the present invention is substantially similar to the link structure of the exemplary embodiment illustrated in FIGS. 1 to 13 except for the differences described below. Similar parts are identified with similar reference numerals, except increased by 100 (i.e., 1xx, accordingly).

The cable guiding portion 154 includes a plurality of cable guiding projections 154A and 154B arranged to define a curved cable guiding space 154C, as shown in FIG. 14. The curved cable guiding space 154C is defined between a first arrangement of cable guiding projections 154A and a second arrangement of cable guiding projections 154B. The first and second arrangements of cable guiding projections 154A and 154B extend successively from a cable entry portion 154D to a cable exit portion 154E to define the curved cable guiding space 154C. The first and second arrangements of cable guiding projections 154A and 154B can have any suitable shape to facilitate receiving an inner wire 20B therebetween. The cable fixing member 152B is configured to engage with the cable attachment base 150A to fix the cable fixing plate 152A on the cable attachment base 150A so that the cable (FIGS. 1 and 5) is disposed between the cable fixing plate 152A and the cable attachment base 150A in the cable guiding portion 154 as described above.

Figure 15:
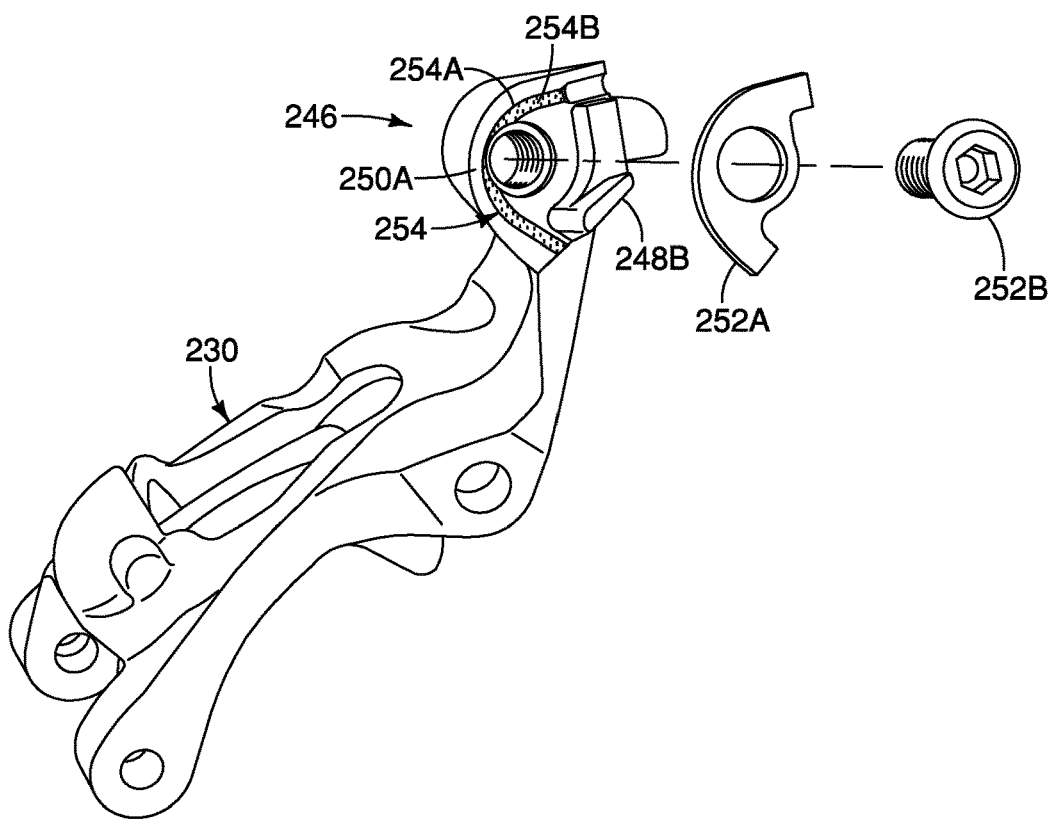
FIG. 15 is an exploded assembly view of a link structure of a bicycle rear derailleur in accordance with still another illustrated embodiment.

As shown in FIG. 15, a link structure of a bicycle rear derailleur in accordance with another illustrated exemplary embodiment of the present invention is substantially similar to the link structure of the exemplary embodiment illustrated in FIGS. 1 to 13 except for the differences described below. Similar parts are identified with similar reference numerals, except increased by 200 (i.e., 2xx, accordingly).

As described above with reference to the first exemplary embodiment, the cable guiding portion 254 includes a recess 254A. The cable guiding portion 254 includes a sticky part 254B, as shown in FIG. 15. The sticky part 254B is preferably disposed in the recess 254A of the cable guiding portion 254. The sticky part can be any suitable material, such as an adhesive, that substantially prevents movement of the cable 20 (FIG. 1) relative to the recess 254A. The cable fixing member 252B is configured to engage with the cable attachment base 250A to fix the cable fixing plate 252A on the cable attachment base 250A so that the cable (FIGS. 1 and 5) is disposed between the cable fixing plate 252A and the cable attachment base 250A in the cable guiding portion 254 as described above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle rear derailleur. Accordingly, these directional terms, as utilized to describe the bicycle rear derailleur should be interpreted relative to a bicycle in an upright riding position on a horizontal surface and that is equipped with the bicycle rear derailleur. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
a base member;
a movable member;
a link structure configured to movably connect the movable member relative to the base member; and
a cable interactive structure provided on the link structure, the cable interactive structure including a chain barrier portion, the chain barrier portion being configured to prevent a chain from contacting the link structure.

2. The bicycle derailleur part according to claim 1, wherein
the chain barrier portion is configured to prevent the chain from contacting the link structure upon pedaling in a state where a chain guide is positioned at a location corresponding to a smallest rear sprocket.

3. The bicycle derailleur according to claim 1, wherein
the cable interactive structure includes a cable attachment structure including a cable fixing portion configured to fix a cable.

4. The bicycle derailleur according to claim 1, wherein
the bicycle derailleur is a bicycle rear derailleur.

5. The bicycle derailleur according to claim 4, wherein
the cable interactive structure includes a cable attachment structure including a cable fixing portion and a cable guiding portion configured to curve a cable, the cable fixing portion being configured to fix a curved part of the cable.

6. The bicycle derailleur according to claim 4, further comprising
a first bushing being supported by the movable member; and
a second bushing being supported by the movable member,
the link structure including at least one link axle having a longitudinal center axis, the first bushing and the second bushing pivotally supporting the at least one link axle, the first bushing and the second bushing being aligned with each other in an axial direction with respect to the longitudinal center axis of the at least one link axle.

7. A bicycle rear derailleur comprising:
a base member;
a movable member;
a link structure configured to movably connect the movable member relative to the base member; and
a cable interactive structure provided on the link structure, the cable interactive structure including a cable attachment structure including a cable fixing member and a cable guiding portion, the cable guiding portion being configured to curve a cable, the cable fixing member being configured to fix at least a curved part of the cable.

8. The bicycle rear derailleur according to claim 7, wherein
the cable guiding portion including a cable guiding recess.

9. The bicycle rear derailleur according to claim 7, wherein
the cable guiding portion including a first curved cable guiding wall and a second curved cable guiding wall to define a curved cable guiding space between the first curved cable guiding wall and the second curved cable guiding wall.

10. The bicycle rear derailleur according to claim 7, wherein
the cable guiding portion including a plurality of cable guiding projections arranged to define a curved cable guiding space.

11. The bicycle rear derailleur according to claim 7, wherein
the cable guiding portion including a sticky part.

12. The bicycle rear derailleur according to claim 7, wherein
the cable attachment structure further includes a cable fixing plate and a cable attachment base including the cable guiding portion, and
the cable fixing member is configured to engage the cable attachment base to fix the cable fixing plate on the cable attachment base so that the cable is disposed between the cable fixing plate and the cable attachment base in the cable guiding portion.

13. A bicycle rear derailleur comprising:
a base member;
a movable member;
a link structure movably connecting the movable member relative to the base member;
a first bushing being supported by the movable member; and
a second bushing being supported by the movable member, the link structure including at least one link axle having a longitudinal center axis, the first bushing and the second bushing being configured to pivotally support the at least one link axle, the first bushing and the second bushing being aligned with each other in an axial direction with respect to the longitudinal center axis of the at least one link axle.

14. The bicycle rear derailleur according to claim 13, wherein
the first bushing is spaced apart from the second bushing in the axial direction.

15. The bicycle rear derailleur according to claim 13, wherein
the movable member includes a bushing receiving portion, the bushing receiving portion including a first bushing receiving space into which the first bushing is disposed and a second bushing receiving space into which the second bushing is disposed.

16. The bicycle rear derailleur according to claim 15, wherein
the bushing receiving portion includes a first abutment contacting the first bushing and a second abutment contacting the second bushing.

17. The bicycle rear derailleur according to claim 15, wherein
the bushing receiving portion includes an intermediate space defined between the first bushing receiving space and the second bushing receiving space.

18. The bicycle rear derailleur according to claim 15, wherein
the link structure includes at least two link axle fixing portions, the bushing receiving portion being positioned between the at least two link axle fixing portions.

19. A bicycle derailleur comprising:
a base member;
a movable member;
a link structure configured to movably connect the movable member relative to the base member, the link structure including at least one link member;
a chain guide provided on the movable member; and
a cable interactive structure provided on the at least one link member, the cable interactive structure including a chain barrier portion, the chain barrier portion including a chain barrier base and a chain abutment member protruding from the chain barrier base, the chain abutment member being positioned between the chain guide and a sprocket assembly of a bicycle in a state where the bicycle derailleur being mounted to a bicycle frame of the bicycle.

20. The bicycle derailleur according to claim 19, wherein the chain abutment member is configured to extend in an earthward direction in a state in which the bicycle derailleur is mounted to the bicycle frame of the bicycle and the bicycle is traveling on the ground.

* * * * *